Jan. 26, 1932. M. C. REYNOLDS 1,842,732
APPARATUS FOR HANDLING MARGARINE AND THE LIKE
Filed June 14, 1929  2 Sheets-Sheet 1
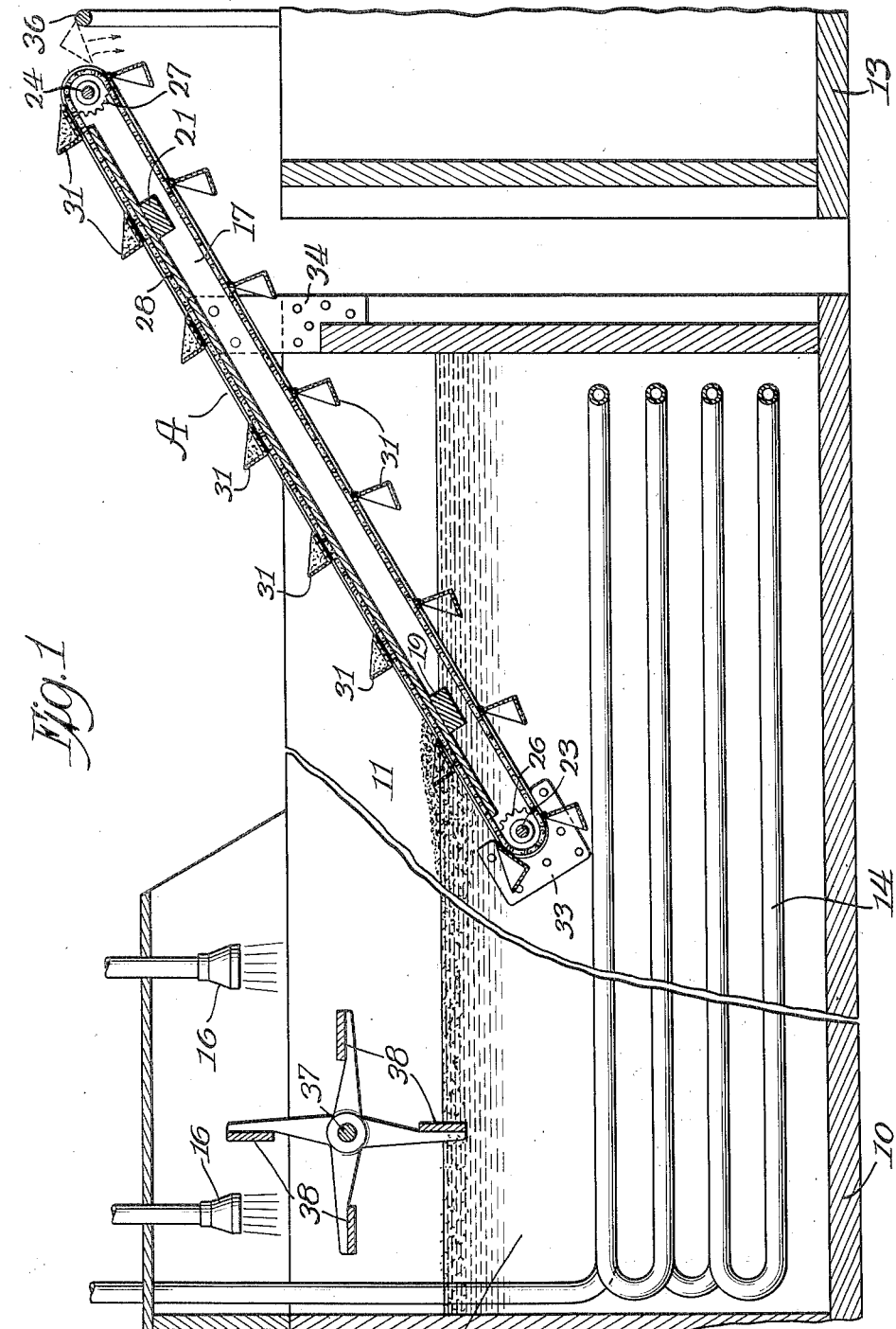

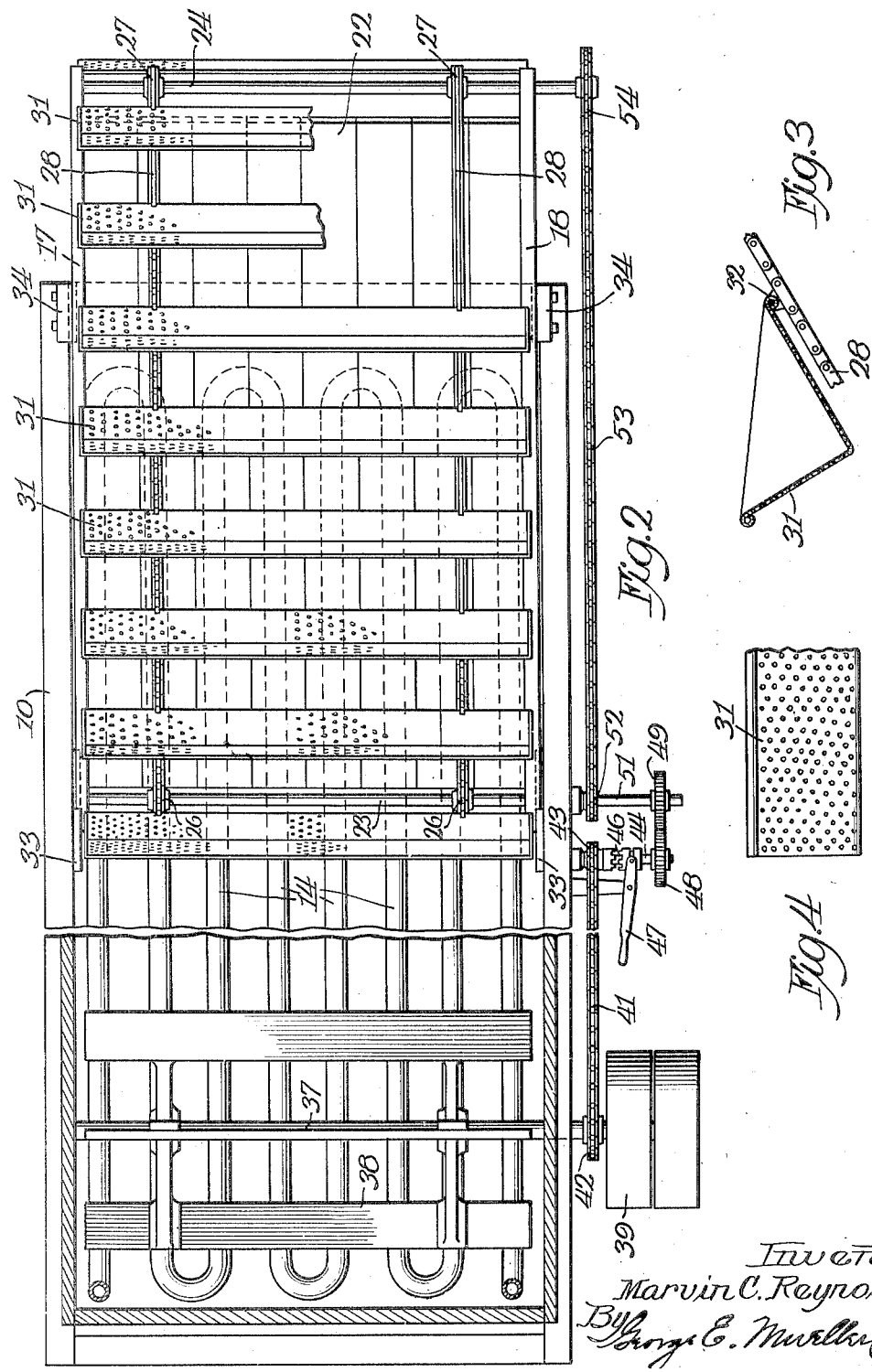

Patented Jan. 26, 1932

1,842,732

UNITED STATES PATENT OFFICE

MARVIN C. REYNOLDS, OF CHICAGO, ILLINOIS

APPARATUS FOR HANDLING MARGARINE AND THE LIKE

Application filed June 14, 1929. Serial No. 370,825.

My invention relates in general to material handling apparatus, and more in particular to apparatus for handling such materials as margarine. In the production of margarine, an emulsion of a type well known in the art is produced at a temperature high enough for all of the constituents thereof to be liquid, and in this condition the emulsion is cooled to solidify it and thereafter is subjected to further treatment preparatory to packing it. In a recent improvement made by me, which is described in detail in United States Patent No. 1,507,426 I spray the margarine emulsion into a vat of ice water so that the emulsion is solidified in the form of very small particles. Thereafter these particles are removed from the ice water, tempered to render the product more plastic, and finally subjected to further treatment to complete the product. My present invention has to do with apparatus for removing the solid particles from the ice water.

Accordingly, the principal object of my invention is the provision of improved apparatus for handling material of this kind. A specific object is the provision of improved elevator means for removing the margarine crystals from the ice water and conveying them to suitable apparatus for further treatment.

Other objects and the main features of my invention will be apparent from a consideration of the following detailed description taken in connection with the accompanying drawings, wherein—

Fig. 1 is a longitudinal sectional view taken through a margarine crystallizing vat and showing my invention applied thereto;

Fig. 2 is a plan view of the apparatus shown in Fig. 1;

Fig. 3 is an enlarged section of one of the elevating buckets; and

Fig. 4 is an enlarged view showing the arrangement of the material employed in the buckets.

Referring now to the drawings, my invention is adapted for use with any standard type of crystallizing vat 10 and includes an elevator mechanism A, which is preferably arranged to remove the solidified margarine 11 from the surface of the ice water 12, and deposit the same into a suitable tempering vat 13. In the crystallizing vat 10, the usual refrigerating pipes 14 are employed, and when used in accordance with my preferred process, described in the patent set forth above, the margarine is sprayed into the ice water from nozzles 16.

As to the elevator proper, this is formed on the principle of providing a baffle and moving the margarine crystals to bank them up against the baffle, where a series of buckets, operating on a continuous conveyor, passes from under the ice water through the collected margarine crystals and out of the water, substantially filled with margarine, due to the concentration of the crystals at the filling point. The buckets continuously move to the top of the elevator, where they are automatically dumped to discharge the crystals for further treatment.

The elevator, as I construct it, comprises a pair of longitudinal members or uprights 17 and 18, connected with a pair of cross pieces 19 and 21. A baffle is formed from a number of slats 22, disposed longitudinally of the elevator and fastened to the cross pieces 19 and 21. This baffle is long enough to extend under the water, as shown in Fig. 1, and, arranged in the manner shown, will have a baffle effect independent of the depth to which the elevator might be placed.

In the moving parts of the elevator, a pair of shafts 23 and 24 are provided, at opposite ends of the elevator, the shafts being suitably journaled in the ends of the uprights 17 and 18. Sprocket gears 26—26 and 27—27 are provided on the shafts over which sprocket chains 28 and 29 are extended for supporting a series of buckets 31. These buckets are hinged to the sprocket chains by loose hinges 32 (Fig. 3), the hinges being so arranged that on the up side of the elevator, the buckets will be in position to carry a load. These buckets extend completely across the elevator and are of any suitable shape to support a good quantity of margarine particles. I prefer the triangular shape, as shown, for several reasons which appear to be obvious. The buckets are constructed of a screen material (Figs. 3 and 4) of such character as to hold all of the margarine, even the small particles, while at the same time permitting proper drainage of the water.

To support the elevator in position, I provide a pair of brackets 33 (Fig. 1) into which the lower ends of the uprights extend. These brackets are secured to the sides of the vat, although they may be supported in any suitable manner. At a suitable position intermediate the ends of the elevator, supports 34 are provided for holding the elevator sufficiently away from the end edge of the vat to permit free passage of the buckets.

The buckets are so constructed and so hinged that they dump themselves, as the drawings illustrate. Since many of the margarine particles are small, however, there is a tendency for some of them to adhere to the buckets. To overcome this tendency, I provide a cross piece 36 suitably supported above the tempering vat 13 and so positioned that, as the buckets fall over by gravity, the outer edge of the bucket will strike against the cross piece 36 with sufficient force to dislodge any margarine particles which might otherwise adhere.

For collecting the margarine against the elevator baffle, any suitable agitating means may be provided. In the present case, I show an agitator comprising a transverse shaft 37, to which paddles 38 are secured, the shaft being driven in any suitable manner, as, for example, by a pulley 39 driven by a suitable belt (not shown). The movement of the paddles drives the top of the liquid with the supernatent margarine toward the opposite end of the vat, so that the margarine particles become collected or massed against the baffle, as shown in Fig. 1.

In the embodiment of the invention herein shown, I drive the elevator from the same source of power as employed to drive the agitator. To secure this result, I use a sprocket chain 41 running on sprockets 42 and 43, the sprocket 42 being secured to the shaft 37, while the sprocket 43 is secured to a stud shaft 44 supported by the side of the vat. A clutch 46, operated by a clutch lever 47, is provided so that movement of the sprocket gear 43 may be communicated to the shaft for driving a separate gear 48. This gear 48 meshes with the gear 49 carried by the shaft 51, and so, by means of a sprocket gear 52, carried by the shaft 51, the chain 53 and sprocket gear 54, secured to the projecting end of the shaft 24, the movement is conveyed to such shaft to drive the elevator.

In the operation of the apparatus, the ice water is regulated in the usual way and the margarine sprayed into the ice water for crystallizing the same. The agitator is operated continuously, so that clear, cold water will be present at all times for reception of the sprayed emulsion and the movement of the margarine collects such margarine against the elevator baffle. When the elevator is to be operated, the clutch 46 is engaged and each succeeding bucket, coming up through the collected margarine solids, will be filled and the bucket will gradually have the water drained therefrom, until at the top most of the ice water will have been drained off. At the top, the buckets are dumped in the manner shown and the margarine is delivered to a receptacle for further treatment, as, for example, in the drawings, into a tempering vat. The elevator can be operated continuously, or whenever sufficient margarine has collected to warrant the operation, this being within the discretion of the operator.

While I have described my invention as particularly applicable to the treatment of margarine by a certain process, it is obvious that the invention may have unusual value in analogous arts. Nor is the spraying process necessary in using my apparatus in the production of margarine, as the margarine can be introduced into the water in any suitable manner and my elevator can be used to advantage.

I am aware that the use of equipment of this general character has been suggested in the past, but my familiarity with industrial processes of this type has shown me that none of the apparatus heretofore suggested has been of any practical value.

What I claim as new and desire to protect by United States Letters Patent is:

1. The herein described apparatus for handling margarine or the like which includes in combination a crystallizing vat and an elevator mechanism including a baffle, an agitator for massing margarine to a substantial depth against the baffle, a plurality of perforated buckets, means for operating the buckets to pass them up through the massed margarine, and means for discharging the margarine from the buckets preparatory to further treatment, the massing of the margarine against the baffle permitting the buckets to pass up therethrough in such a way as to pick up a maximum amount of margarine and a minimum amount of water.

2. The combination set forth in claim 1 with means for dumping the buckets with a jarring movement to dislodge margarine particles which might otherwise adhere to the bucket surface and close the perforations therein.

3. The herein described apparatus for handling margarine and the like including a crystallizing vat adapted for supporting cold water into which the margarine is precipitated, a tempering vat disposed adjacent the crystallizing vat, an elevator conveying mechanism adapted to be supported at an angle with its lower end extending below the surface of the water in the crystallizing vat and its upper end projecting over the tempering vat, a baffle forming a part of the elevator and disposed at the water line in the crystallizing vat, an agitating mechanism for driving the margarine against the baffle to mass it thereagainst, and a plurality of buckets formed of screen material and constituting a part of the elevator conveying mechanism so disposed with respect to the baffle as to emerge from the water along the face of such baffle so as to pick up the margarine at its point of greatest concentration against the baffle.

4. The herein described apparatus for handling margarine or the like, which comprises a margarine crystallizing vat for containing refrigerated water, means for driving margarine on the surface of the water toward one end of the vat, means for collecting the driven margarine near the end of the vat in a substantial layer, a bucket mechanism having buckets formed of screen material, and means for passing the buckets upwardly through the water and through the collected margarine to remove a maximum amount of the margarine from the refrigerated water and a minimum amount of water.

5. The herein described apparatus for handling margarine or the like, which comprises a margarine crystallizing vat for containing refrigerated water, means for driving margarine on the surface of the water toward one end of the vat, a baffle supported at an angle for collecting the margarine to a substantial depth near one end of the vat, an elevator mechanism, including buckets formed of screen material, and means for moving the buckets from beneath the water and along the baffle to remove a maximum amount of the margarine from the refrigerated water with a minimum amount of water.

In witness whereof, I hereunto subscribe my name this 15th day of May, 1929.

MARVIN C. REYNOLDS.